United States Patent
Abramson et al.

(10) Patent No.: US 7,607,869 B2
(45) Date of Patent: Oct. 27, 2009

(54) CUTTING INSERT HAVING MAIN AND SECONDARY CHIP FORMERS

(75) Inventors: Michael Abramson, Ma'alot (IL); Eitan Gonen, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 12/188,548

(22) Filed: Aug. 8, 2008

(65) Prior Publication Data

US 2009/0067937 A1 Mar. 12, 2009

(30) Foreign Application Priority Data

Sep. 9, 2007 (IL) .................................... 185840

(51) Int. Cl.
*B23C 27/00* (2006.01)
*B23C 27/22* (2006.01)
(52) U.S. Cl. ...................................... 407/114; 407/113
(58) Field of Classification Search .............. 407/100, 407/103, 113, 114, 115, 116
See application file for complete search history.

(56) References Cited

U.S. PATENT DOCUMENTS

| | | | |
|---|---|---|---|
| 5,032,049 A | * | 7/1991 | Hessman et al. ............ 407/113 |
| 5,052,863 A | * | 10/1991 | Satran ......................... 407/113 |
| 5,383,750 A | | 1/1995 | Satran et al. |
| 5,685,670 A | | 11/1997 | Satran |
| 5,951,214 A | | 9/1999 | Rothballer et al. |
| 6,142,716 A | * | 11/2000 | Jordberg et al. ............. 407/114 |
| 6,872,034 B2 | | 3/2005 | Satran et al. |
| 7,070,363 B2 | * | 7/2006 | Long et al. ................... 407/113 |
| 7,452,167 B2 | * | 11/2008 | Nishio et al. ................. 407/113 |
| 2008/0008545 A1 | | 1/2008 | Rofner et al. |

FOREIGN PATENT DOCUMENTS

WO 93/13899 7/1993

OTHER PUBLICATIONS

International Search Report in PCT/IL2008/001046, dated Dec. 30, 2008.

* cited by examiner

*Primary Examiner*—Will Fridie, Jr.
(74) *Attorney, Agent, or Firm*—Womble Carlyle

(57) ABSTRACT

As seen in a side view of a cutting insert, the cutting insert is provided with cutting edges that slope in opposite directions. A rake surface extends at the upper surface inwardly from the cutting edges. An inward portion of the rake surface forms a main chip former. A first end of the rake surface adjacent a raised cutting corner and distal a lower cutting corner is provided with a secondary chip former that extends from adjacent the raised cutting corner to the main chip former.

29 Claims, 7 Drawing Sheets

CUTTING INSERT HAVING MAIN AND SECONDARY CHIP FORMERS

FIELD OF THE INVENTION

The present invention relates to an indexable cutting insert.

BACKGROUND OF THE INVENTION

Indexable cutting inserts having cutting edges inclined in opposite directions are known. Such cutting inserts are disclosed, for example, in U.S. Pat. No. 5,383,750 to Satran et al, U.S. Pat. No. 5,685,670 to Satran and U.S. Pat. No. 5,951,214 to Rothballer et al. These cutting inserts are typically used for milling and have a generally square shape with peripherally located cutting edges having rake surfaces that extend inwardly and downwardly toward a center portion of the cutting insert.

Other type of cutting insert is shown, for example, in U.S. Pat. No. 6,872,034 to Satran et al, disclosing a tangential milling cutting insert. Each end surface of the cutting insert is provided with at least one projecting abutment member having a projecting abutment surface.

When using cutting inserts for carrying out drilling operations, it may be necessary to have better control of chip breaking in the vicinity of the trailing end of the cutting edge when there is overlap of the trailing sections of the cutting edges of two cutting inserts.

SUMMARY OF THE INVENTION

In accordance with the present invention there is provided a cutting insert comprising an upper surface, a lower surface defining a lower plane, and a peripheral surface extending between the upper surface and the lower surface, the peripheral surface is provided with a first pair of opposing first side surfaces and a second pair of opposing second side surfaces, each of the first side surfaces merges with each of the adjacent second side surfaces at a side edge, an intersection of each of the first side surfaces and the upper surface constitutes a cutting edge, the intersection of each of the side edges and the upper surface constitutes a cutting corner, each of the cutting edges merges with a lower cutting corner at a first end thereof, a raised cutting corner at a second end thereof, and is associated with a rake surface extending inwardly therefrom at the upper surface, the cutting edges sloping in opposite directions as seen in a front view of the cutting insert, an inward portion of the rake surface distal the cutting edge forms a main chip former having an upper end, each portion of the upper end is distanced from the lower plane by an end distance that is larger than a distance from the lower plane to an adjacent cutting edge portion that lies on a line perpendicular to the cutting edge and passing through the associated portion of the upper end, wherein a first end of the rake surface adjacent the raised cutting corner and distal the lower cutting corner is provided with a secondary chip former that extends from adjacent the raised cutting corner to the main chip former.

Typically, the secondary chip former has an outward end adjacent the raised cutting corner, an inward end distal the raised cutting corner, and a second reference line that passes through the outward and inward ends of the secondary chip former is oblique with respect to the main chip former in a top view of the cutting insert.

Further typically, an upper end of the secondary chip former merges with the upper end of the main chip former at the inward end of the secondary chip former and distal the raised cutting corner.

Still further typically, an inward line perpendicular to the cutting edge and passing through the inward end of the secondary chip former is closer to the lower cutting corner than an outward line perpendicular to the cutting edge and passing through the outward end of the secondary chip former.

Advantageously, the raised cutting corner is distanced a corner distance from the lower plane, a center portion of the upper end of the secondary chip former is distanced a center distance from the lower plane, an inward portion of the upper end of the secondary chip former is distanced an inward distance from the lower plane, and the corner distance is larger than the center distance and smaller than the inward distance.

Typically, the secondary chip former merges with the rake surface at a base merging line.

As seen in a top view of the cutting insert, a forward direction line that passes through the inward end of the secondary chip former, perpendicular to the second reference line that passes through the outward and inward ends of the secondary chip former, and extending from the inward end of the secondary chip former to the adjacent cutting edge, defines a forward direction towards the adjacent cutting edge, the base merging line has an outward portion adjacent the outward end of the secondary chip former and an inward portion adjacent the inward end of the secondary chip former, and the outward portion of the base merging line is rearwardly located with respect to the second reference line and the inward portion of the base merging line is forwardly located with respect to the second reference line.

Further typically, a rearward extremity of the base merging line is located closer to the cutting edge than a forward extremity of the base merging line.

If desired, the cutting insert is provided with a through bore having a longitudinal axis A and extending between the upper surface and the lower surface.

Typically, each portion of the upper surface beyond the upper end of the main chip former and away from the cutting edge slopes at a different inclination angle with respect to the lower surface.

Further typically, the inclination angle varies from a positive value to a negative value along the length of the upper end of the main chip former.

If desired, each of the first side surfaces has a first relief surface that extends downwardly from the cutting edge towards the lower surface, the first relief surface is slanted at a first relief angle with respect to a first reference line perpendicular to the lower plane, a second relief surface extends downwardly from the first relief surface to the lower surface, and the second relief surface is slanted at a second relief angle with respect to the first reference line.

Typically, the first relief angle is smaller than the second relief angle.

According to a first embodiment of the present invention, the cutting insert has a generally square shape in a top view of the cutting insert, and a center of a line connecting two diametrically opposed raised cutting corners defines a center of 180° rotational symmetry of the cutting insert as seen in a top view of the cutting insert.

According to a second embodiment of the present invention, the cutting insert has a generally square shape in a top view of the cutting insert, and a line connecting two diametrically opposed raised cutting corners defines a symmetry line of the cutting insert as seen in a top view of the cutting insert.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
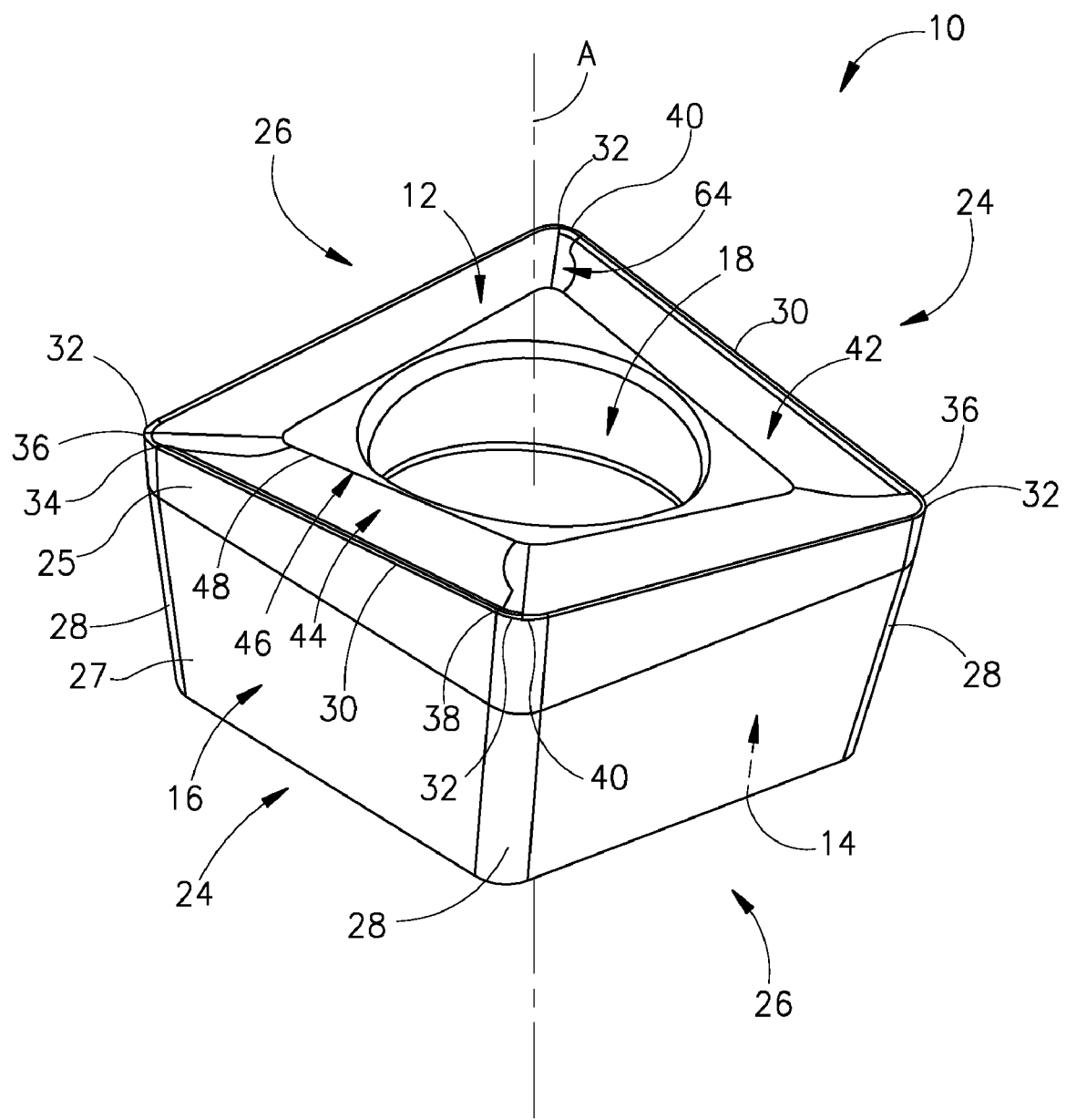
FIG. 1 is a perspective view of a cutting insert in accordance with the present invention.
Figure 2:
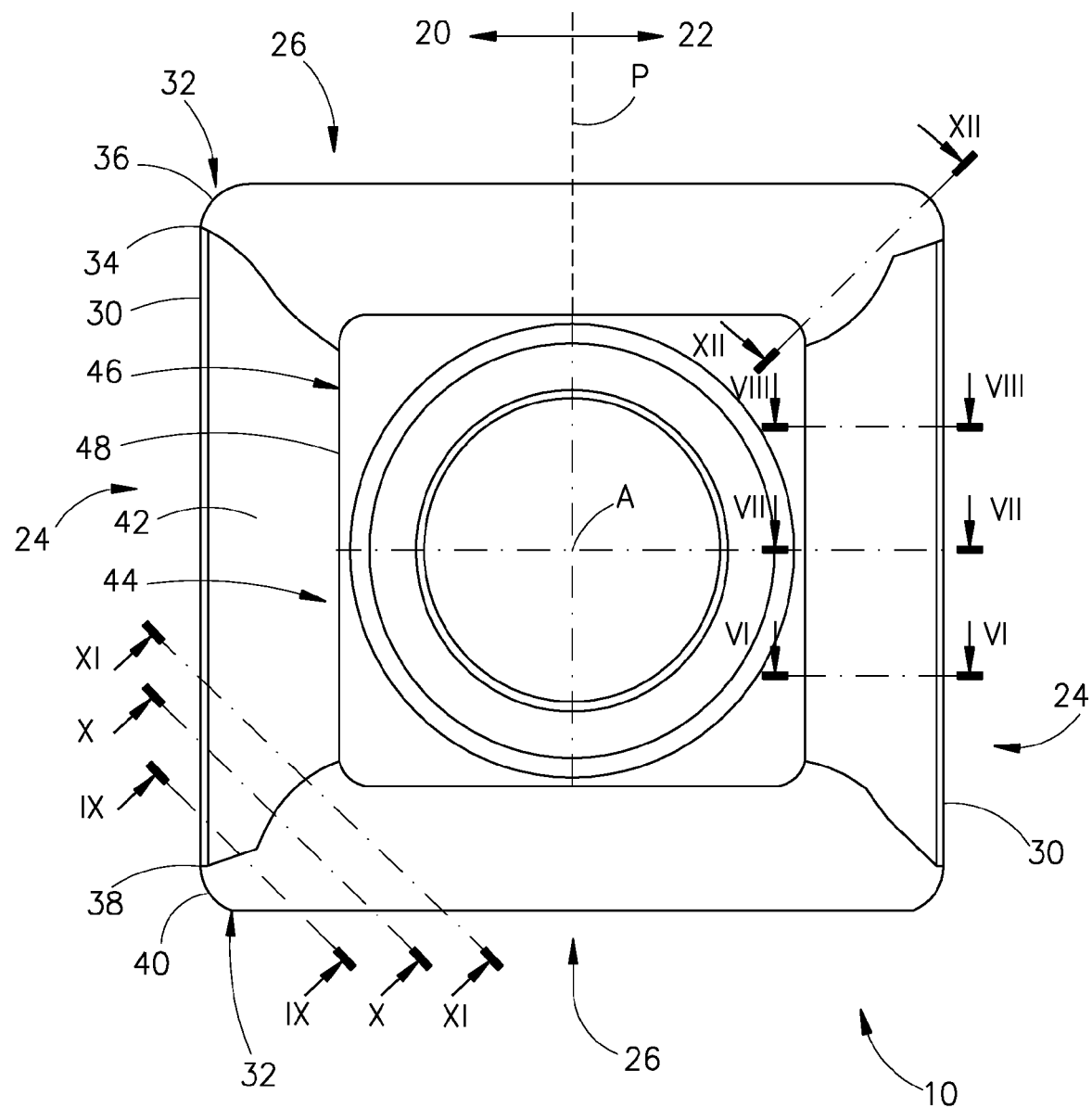
FIG. 2 is an enlarged top view of the cutting insert of FIG. 1.

Attention is first drawn to FIGS. 1 to 12 showing a cutting insert 10 in accordance with the present invention. The cutting insert 10 comprises an upper surface 12, a lower surface 14, and a peripheral surface 16 extending between the upper surface 12 and the lower surface 14. A through bore 18 having an axis A extends between the upper surface 12 and the lower surface 14.

The cutting insert 10 has a generally square shape as seen in a top view of the cutting insert. According to a first embodiment of the present invention, a plane P containing the axis A divides the cutting insert 10 into a first section 20 and a second section 22. The two sections 20, 22 are identical, that is, the cutting insert has 180° rotational symmetry with respect to the axis A. Therefore only one of the sections 20, 22 will be described.

Figure 4:
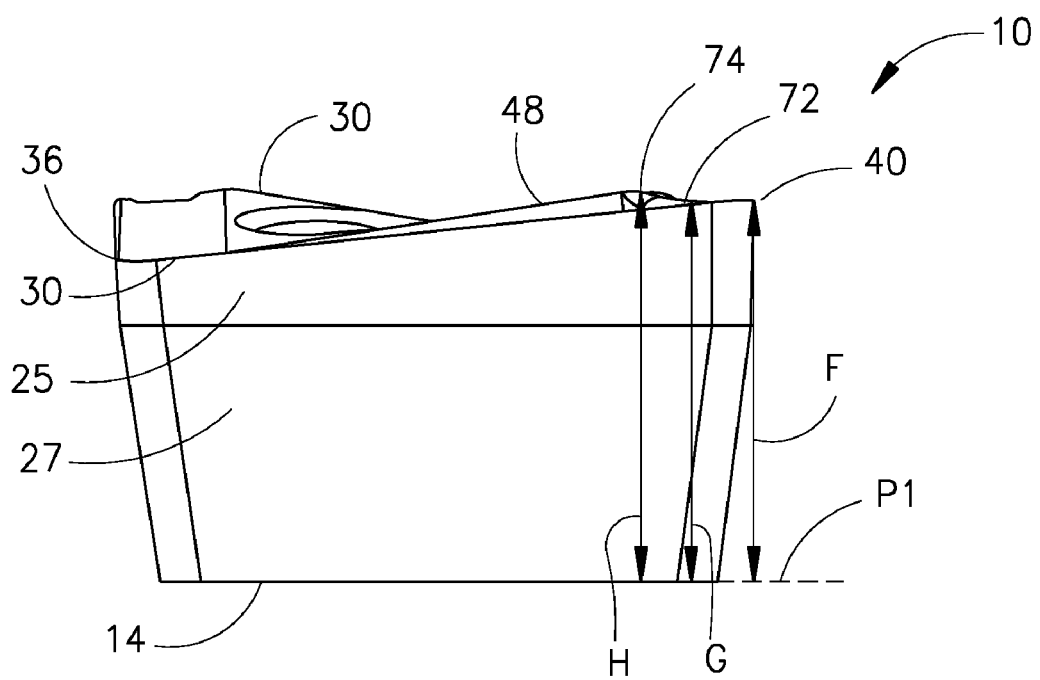
FIG. 4 is a first side view of the cutting insert of FIG. 1.
Figure 5:
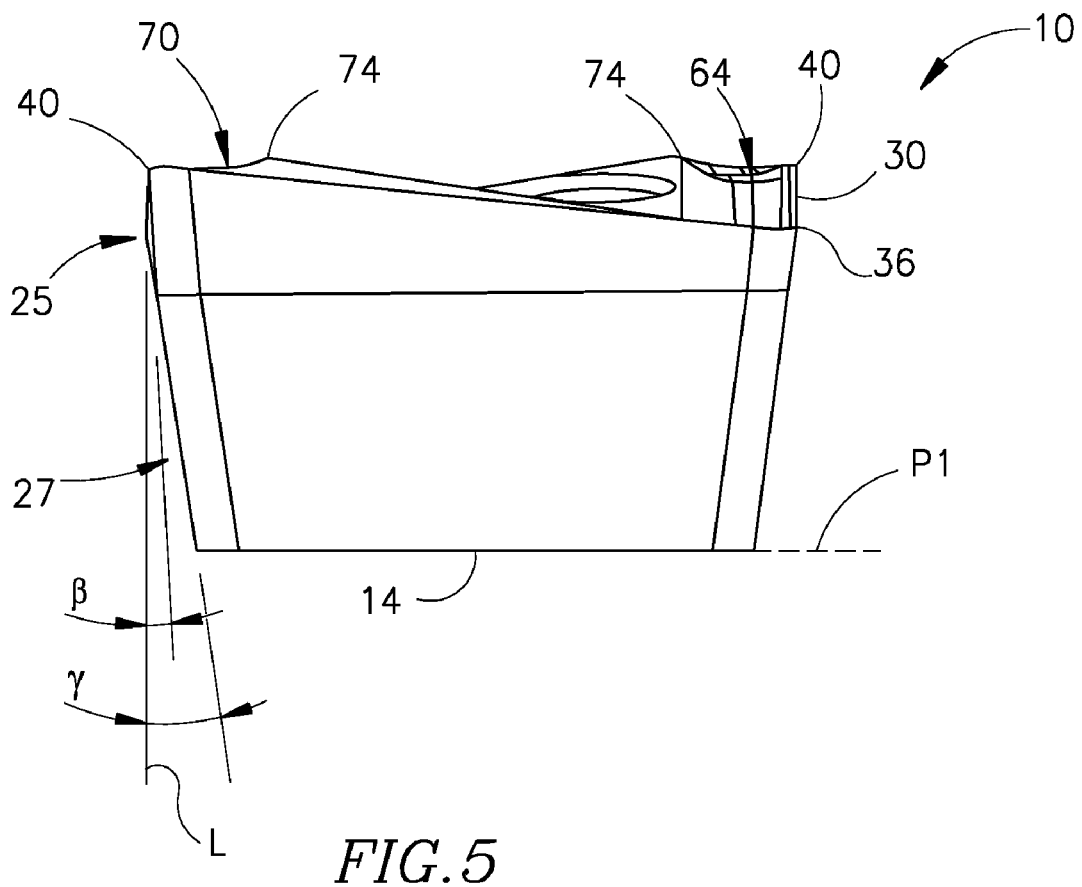
FIG. 5 is a second side view of the cutting insert of FIG. 1.

The peripheral surface 16 is provided with a first pair of opposing first side surfaces 24 and a second pair of opposing second side surfaces 26, each of the first side surfaces 24 merges with each of the adjacent second side surfaces 26 at a side edge 28. The intersection of each of the first side surfaces 24 and the upper surface 12 forms a cutting edge 30. Thus, the cutting insert 10 is provided with two cutting edges 30 and is two times indexable. As seen in FIG. 4, the cutting edges 30 slope in opposite directions in a side view of the cutting insert 10.

Each of the first side surfaces 24 has a first relief surface 25 that extends downwardly from the cutting edge 30 towards the lower surface 14. The first relief surface 25 is slanted at a first relief angle β with respect to a first reference line L perpendicular to a lower plane P1 defined by the lower surface 14. A second relief surface 27 extends downwardly from the first relief surface 25 to the lower surface 14. The second relief surface 27 is slanted at a second relief angle γ with respect to the first reference line L. Typically, the first relief angle β is smaller than the second relief angle γ.

The intersection of each of the side edges 28 and the upper surface 12 forms a cutting corner 32. Each cutting edge 30 merges with a cutting corner 32 at both ends thereof. At a first, lowered end 34 thereof, the cutting edge 30 merges with a lower cutting corner 36 and at a second, raised end 38 thereof the cutting edge 30 merges with a raised cutting corner 40.

Figure 6:
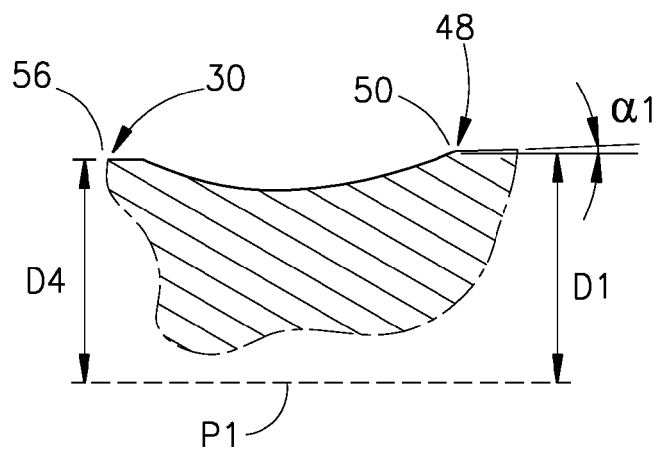
FIG. 6 is a cross-sectional view taken along line VI-VI in FIG. 2.
Figure 7:
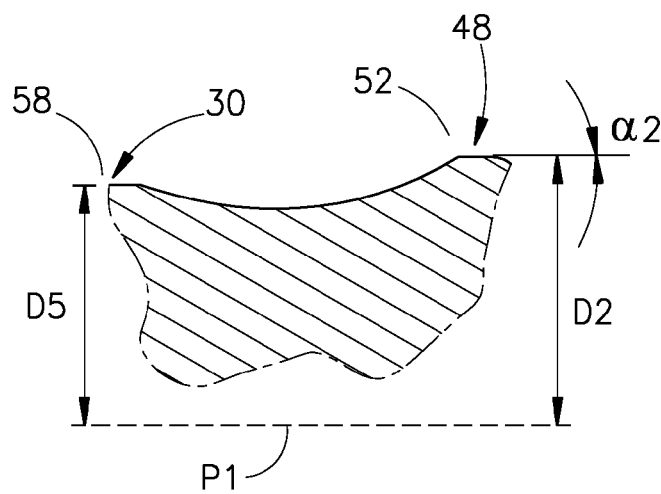
FIG. 7 is a cross-sectional view taken along line VII-VII in FIG. 2.
Figure 8:
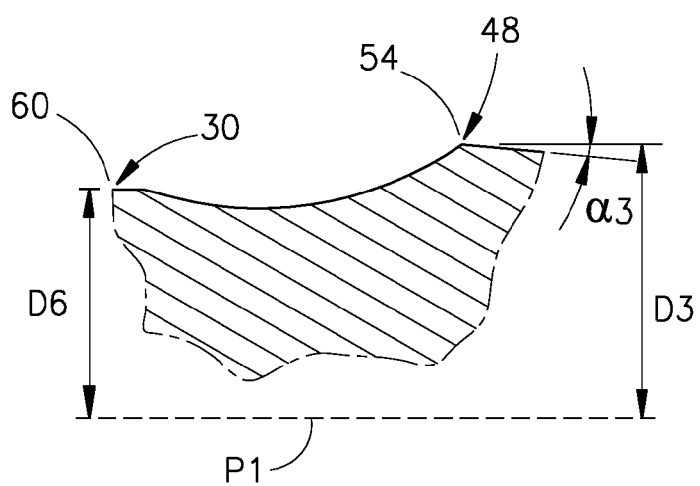
FIG. 8 is a cross-sectional view taken along line VIII-VIII in FIG. 2.
Figure 9:
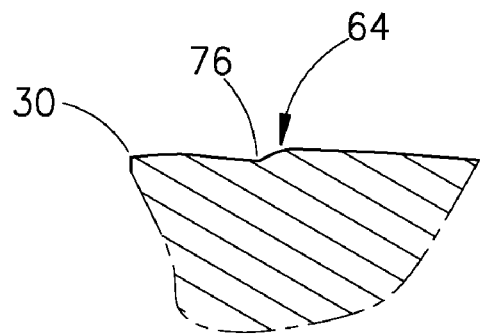
FIG. 9 is a cross-sectional view taken along line IX-IX in FIG. 2.
Figure 10:
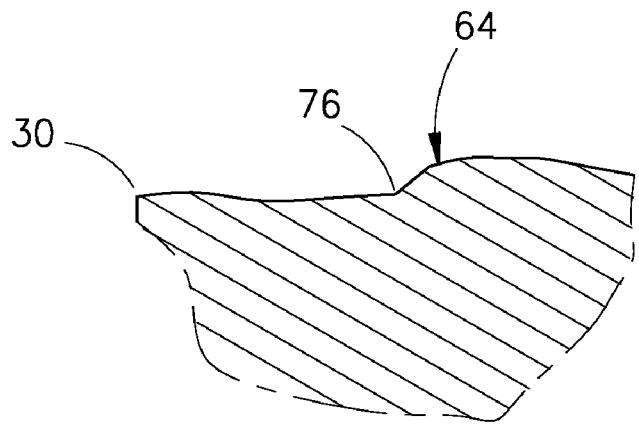
FIG. 10 is a cross-sectional view taken along line X-X in FIG. 2.
Figure 11:
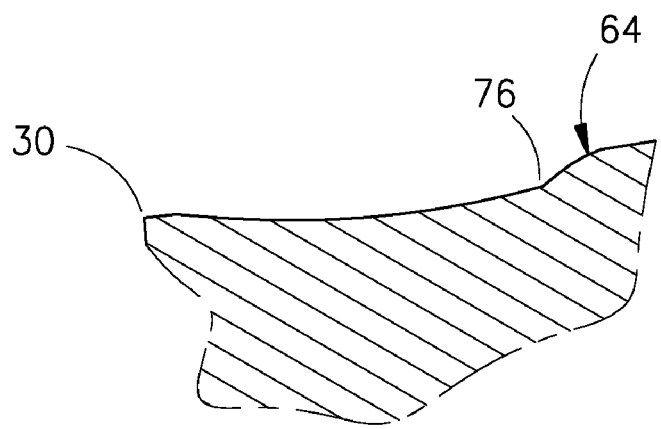
FIG. 11 is a cross-sectional view taken along line XI-XI in FIG. 2.
Figure 12:
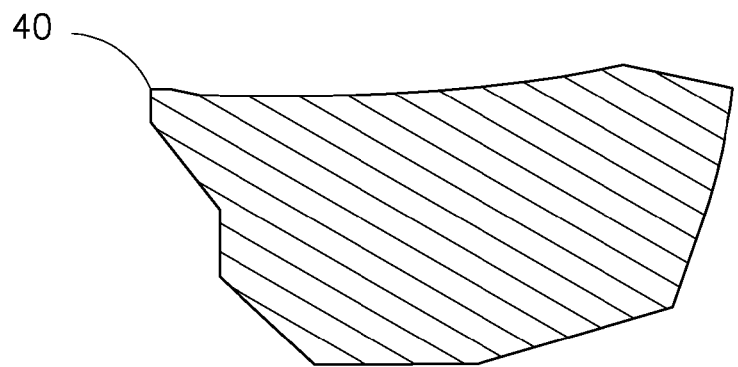
FIG. 12 is a cross-sectional view taken along line XII-XII in FIG. 2.

The cutting edge 30 is associated with a rake surface 42 which extends inwardly therefrom at the upper surface 12. An inward portion 44 of the rake surface 42 distal the cutting edge 30 forms a main chip former 46 having an upper end 48. As seen in FIGS. 6 to 8 that show three different cross-sections along the cutting edge 30, each portion of the upper end 48 of the main chip former 46 is higher than the adjacent cutting edge portion, i.e., for clarification purposes, each portion 50, 52, 54 of the upper end 48 is distanced from the lower plane P1 a respective end distance D1, D2, D3 that is larger than a distance D4, D5, D6 from the lower plane P1 to a respective adjacent cutting edge portion 56, 58, 60 that lies on a line perpendicular to the cutting edge 30 and passing through the associated portion 50, 52, 54 of the upper end 48. Since FIGS. 6 to 8 are partial cross-sections, the distances D1 to D6 do not show the exact distance to the lower plane P1 that is represented by dashed lines, however, they show the relative height difference between the distances D1, D2, D3 of the upper end 48 to the respective height D4, D5, D6 of their cutting edge portions.

Due to the construction of the cutting insert such that the cutting edges slope in opposite directions in a side view of the cutting insert, each portion of the upper surface 12 beyond the upper end 48 of the main chip former 46 and away from the cutting edge 30 slopes at a different inclination angle α with respect to the lower plane P1. The inclination angles α1, α2 and α3 show, respectively, the inclination angles at cross-sections VI-VI, VII-VII and VIII-VIII. As shown, the inclination angle α varies from a positive value to a negative value along the length of the upper end 48 of the main chip former 46.

Figure 3:
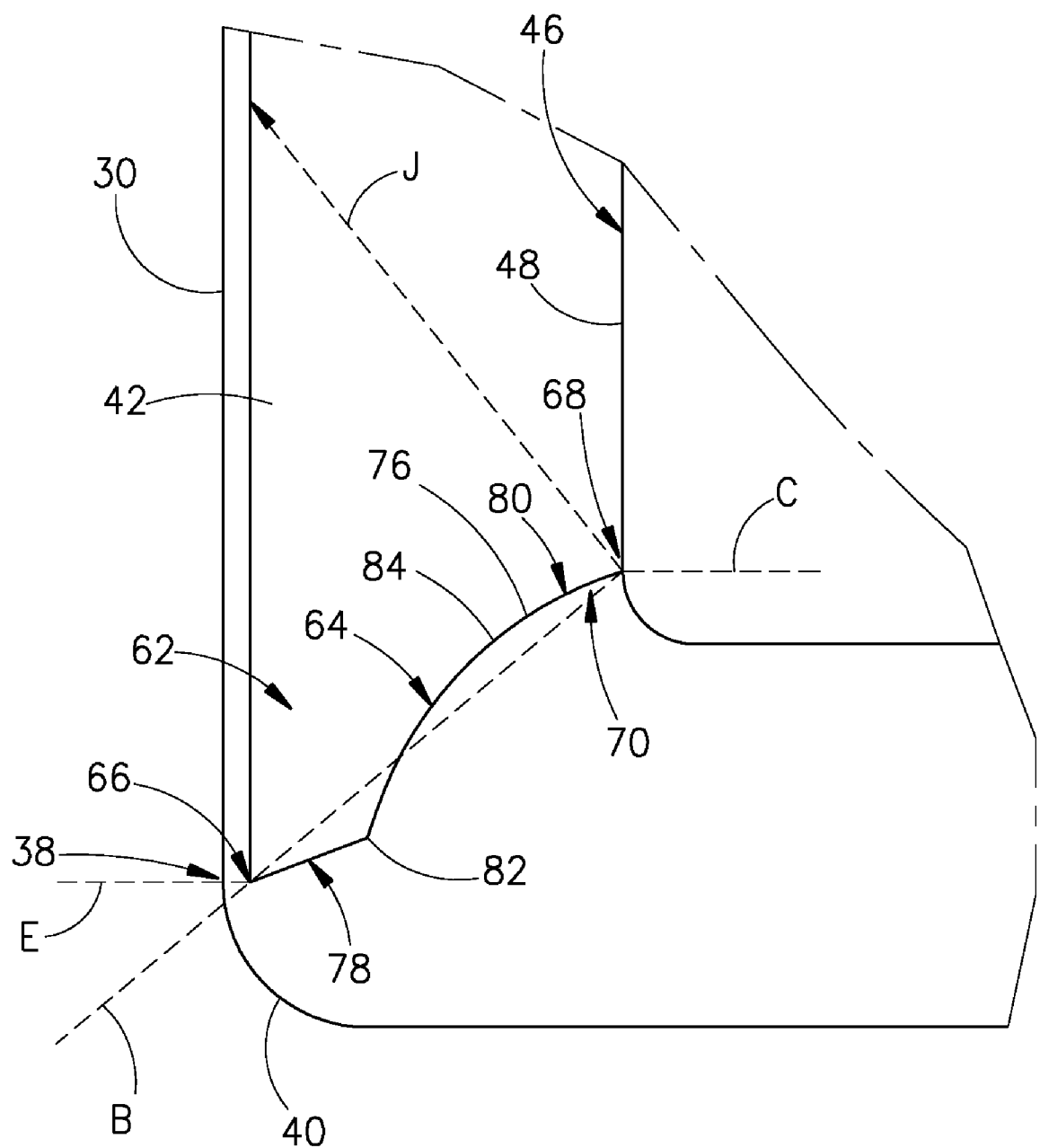
FIG. 3 is an enlarged view of the secondary chip former of FIG. 2.

A first end 62 of the rake surface 42 adjacent the raised cutting corner 40 and distal the lower cutting corner 36 is provided with a secondary chip former 64 that extends from adjacent the raised cutting corner 40 to the main chip former 46. The secondary chip former 64 has an outward end 66 adjacent the raised cutting corner 40 and an inward end 68 distal the raised cutting corner 40. As shown in FIG. 3, a second reference line B that passes through the outward and inward ends 66, 68 of the secondary chip former 64 is oblique with respect to the main chip former 46. Thus, the secondary chip former 64 associated with a given cutting edge 30 extends from proximate the raised end 38 of that cutting edge 30 to the associated main chip former 46.

The upper end 70 of the secondary chip former 64 merges with the upper end 48 of the main chip former 46 at the inward end 68 of the secondary chip former 64 and distal the raised cutting corner 40.

The secondary chip former 64 is directed such that an inward line C that is perpendicular to the cutting edge 30 and passes through the inward end 68 of the secondary chip former 64 is closer to the lower cutting corner 36 than an outward line E that is perpendicular to the cutting edge 30 and passes through the outward end 66 of the secondary chip former 64.

As shown in FIG. 4, the raised cutting corner 40 is distanced a corner distance F from the lower plane P1, a center portion 72 of the upper end 70 of the secondary chip former 64 is distanced a center distance G from the lower plane P1 and an inward portion 74 of the upper end 70 of the secondary chip former 64 is distanced an inward distance H from the lower plane P1. The corner distance F is larger than the center distance G and smaller than the inward distance H.

As shown in FIG. 3, the secondary chip former 64 merges with the rake surface 42 at a base merging line 76. A forward direction J towards the adjacent cutting edge 30 is defined by a line that: (a) passes through the inward end 68 of the secondary chip former 64, (b) is perpendicular to the second reference line B that passes through the outward and inward ends 66, 68 of the secondary chip former 64, and (c) extends from the inward end 68 of the secondary chip former 64 to the adjacent cutting edge 30. The base merging line 76 has an outward portion 78 adjacent the outward end 66 of the secondary chip former 64 and an inward portion 80 adjacent the inward end 68 of the secondary chip former 64. The outward portion 78 of the base merging line 76 is rearwardly located with respect to the second reference line B and the inward portion 80 of the base merging line 76 is forwardly located with respect to the second reference line B. Furthermore, a rearward extremity 82 of the base merging line 76 is located closer to the cutting edge 30 than a forward extremity 84 of the base merging line 76.

The cutting insert 10 as described above may be used for drilling operations when mounted in a drilling cutting tool. The design of the secondary chip former 64 enables improved braking of chips cut from a workpiece when there is overlap in the upper portion of the cutting edges of two cutting inserts mounted in the same cutting tool.

Figure 13:
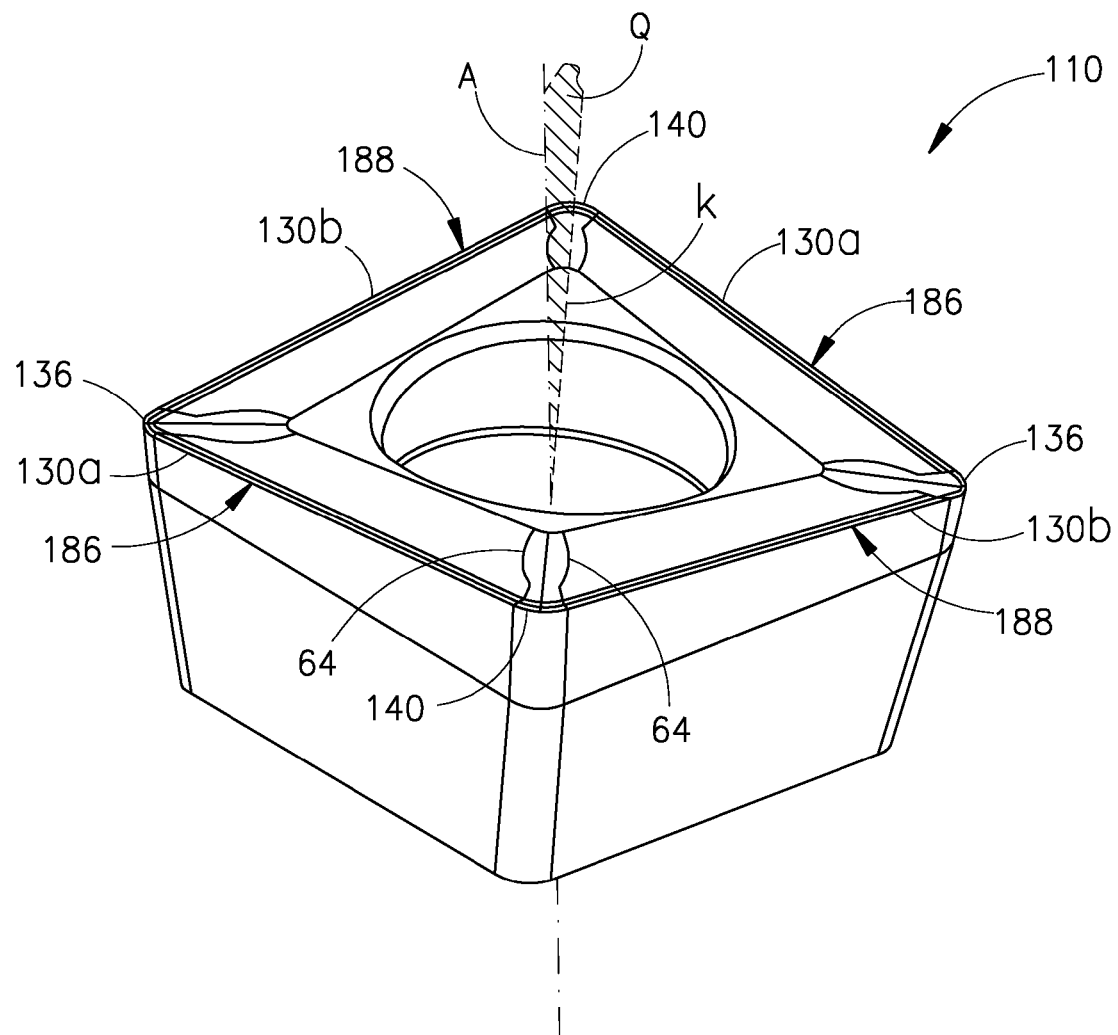
FIG. 13 is a perspective view of another embodiment of a cutting insert in accordance with the present invention.

FIG. 13 shows another embodiment of a cutting insert 110 according to the present invention. According to this embodiment, the cutting insert 110 has a generally square shape in a top view of the cutting insert. The cutting insert 110 is similar to the cutting insert 10. However, a line K that connects two diametrically opposed raised cutting corners 140 defines a symmetry plane Q of the cutting insert 110. The symmetry plane Q contains the line K and the axis A, is perpendicular to the lower plane P1, and the cutting insert 110 has reflection symmetry with respect to the symmetry plane Q. Thus, the cutting insert 110 is provided with two pairs of cutting edges. A first pair 186 of cutting edges 130a is for right hand rotation of a tool in which the cutting insert 110 is retained and a second pair 188 of cutting edges 130b is for left hand rotation. The cutting insert 110 may be indexable two times for either side of rotation.

Although the present invention has been described to a certain degree of particularity, it should be understood that various alterations and modifications could be made without departing from the spirit or scope of the invention as hereinafter claimed.

What is claimed is:

1. A cutting insert comprising an upper surface, a lower surface defining a lower plane, and a peripheral surface extending between the upper surface and the lower surface,
    the peripheral surface is provided with a first pair of opposing first side surfaces and a second pair of opposing second side surfaces, each of the first side surfaces merges with each of the adjacent second side surfaces at a side edge,
    an intersection of each of the first side surfaces and the upper surface forms a cutting edge, the intersection of each of the side edges and the upper surface forms a cutting corner, each of the cutting edges merges with a lower cutting corner at a first end thereof and with a raised cutting corner at a second end thereof, each of the cutting edges is associated with a rake surface extending inwardly therefrom at the upper surface, the cutting edges slope in opposite directions as seen in a side view of the cutting insert,
    an inward portion of the rake surface distal the cutting edge forms a main chip former having an upper end, each portion of the upper end is distanced from the lower plane by an end distance that is larger than a respective distance from the lower plane to an adjacent cutting edge portion that lies on a line perpendicular to the cutting edge and passing through the associated portion of the upper end, wherein:
    a first end of the rake surface adjacent the raised cutting corner and distal the lower cutting corner is provided with a secondary chip former that extends from adjacent the raised cutting corner to the main chip former.

2. The cutting insert according to claim 1, wherein:
    the secondary chip former has an outward end adjacent the raised cutting corner and an inward end distal the raised cutting corner; and
    a second reference line that passes through the outward and inward ends of the secondary chip former is oblique with respect to the main chip former, in a top view of the cutting insert.

3. The cutting insert according to claim 1, wherein an upper end of the secondary chip former merges with the upper end of the main chip former at an inward end of the secondary chip former and distal the raised cutting corner.

4. The cutting insert according to claim 3, wherein an inward line perpendicular to the cutting edge and passing through the inward end of the secondary chip former is closer to the lower cutting corner than an outward line perpendicular to the cutting edge and passing through an outward end of the secondary chip former.

5. The cutting insert according to claim 1, wherein the raised cutting corner is distanced a corner distance from the lower plane, a center portion of the upper end of the secondary chip former is distanced a center distance from the lower plane, an inward portion of the upper end of the secondary chip former is distanced an inward distance from the lower plane, and the corner distance is larger than the center distance and smaller than the inward distance.

6. The cutting insert according to claim 1, wherein:
    the secondary chip former has an outward end adjacent the raised cutting corner and an inward end distal the raised cutting corner;
    the secondary chip former merges with the rake surface at a base merging line;
    as seen in a top view of the cutting insert, a forward direction line that passes through the inward end of the secondary chip former, perpendicular to a second reference line that passes through the outward and inward ends of the secondary chip former, and extending from the inward end of the secondary chip former to the adjacent cutting edge defines a forward direction towards the adjacent cutting edge,
    the base merging line has an outward portion adjacent the outward end of the secondary chip former and an inward portion adjacent the inward end of the secondary chip former, and
    the outward portion of the base merging line is rearwardly located with respect to the second reference line and the inward portion of the base merging line is forwardly located with respect to the second reference line.

7. The cutting insert according to claim 6, wherein a rearward extremity of the base merging line is located closer to the cutting edge than a forward extremity of the base merging line.

8. The cutting insert according to claim 1, wherein the cutting insert is provided with a through bore extending between the upper surface and the lower surface.

9. The cutting insert according to claim 1, wherein each portion of the upper surface beyond the upper end of the main chip former and away from the cutting edge slopes at a different inclination angle with respect to the lower plane.

10. The cutting insert according to claim 9, wherein the inclination angle varies from a positive value to a negative value along the length of the upper end of the main chip former.

11. The cutting insert according to claim 1, wherein each of the first side surfaces has a first relief surface that extends downwardly from the cutting edge towards the lower surface, the first relief surface is slanted at a first relief angle with respect to a first reference line perpendicular to the lower plane, a second relief surface extends downwardly from the first relief surface to the lower surface, and the second relief surface is slanted at a second relief angle with respect to the first reference line.

12. The cutting insert according to claim 11, wherein the first relief angle is smaller than the second relief angle.

13. The cutting insert according to claim 1, wherein the cutting insert has a generally square shape in a top view of the cutting insert, and a center of a line connecting two diametrically opposed raised cutting corners defines a center of 180° rotational symmetry of the cutting insert as seen in a top view of the cutting insert.

14. The cutting insert according to claim 1, wherein the cutting insert has a generally square shape in a top view of the cutting insert, and a plane perpendicular to the lower plane and passing through two diametrically opposed raised cutting corners defines a symmetry plane of the cutting insert.

15. A cutting insert comprising:
an upper surface;
a lower surface defining a lower plane;
a peripheral surface extending between the upper surface and the lower surface, the peripheral surface being provided with a first pair of opposing first side surfaces and a second pair of opposing second side surfaces, each of the first side surfaces being connected to each of the second side surfaces;
a cutting edge formed at an intersection of each first side surface and the upper surface, each cutting edge having a raised end and a lowered end, the cutting edges sloping in opposite directions as seen in a side view of the cutting insert;
a rake surface associated with each cutting edge and extending inwardly therefrom at the upper surface, an inward portion of the rake surface distal a given cutting edge forming a main chip former having an upper end, each portion of the upper end being distanced from the lower plane by an end distance that is larger than a respective distance from the lower plane to an adjacent cutting edge portion that lies on a line perpendicular to said given cutting edge and passing through the associated portion of the upper end; and
a secondary chip former associated with each cutting edge and extending from proximate the raised end of the associated cutting edge to the main chip former, the secondary chip former having an outward end adjacent the raised end of the associated cutting edge and an inward end adjacent the main chip former.

16. The cutting insert according to claim 15, wherein:
a second reference line that passes through the outward and inward ends of the secondary chip former is oblique with respect to the main chip former, in a top view of the cutting insert.

17. The cutting insert according to claim 15, wherein:
an upper end of the secondary chip former merges with the upper end of the main chip former at the inward end of the secondary chip former.

18. The cutting insert according to claim 15, wherein:
an inward line perpendicular to the cutting edge and passing through the inward end of the secondary chip former is closer to the lower cutting corner than an outward line perpendicular to the cutting edge and passing through the outward end of the secondary chip former.

19. The cutting insert according to claim 15, wherein:
each of the first side surfaces merges with each of the adjacent second side surfaces at a side edge;
the intersection of each of the side edges and the upper surface forms a cutting corner; and
each of the cutting edges merges with a lower cutting corner at a first end thereof and with a raised cutting corner at a second end thereof.

20. The cutting insert according to claim 19, wherein:
the raised cutting corner is distanced a corner distance from the lower plane;
a center portion of the upper end of the secondary chip former is distanced a center distance from the lower plane;
an inward portion of the upper end of the secondary chip former is distanced an inward distance from the lower plane; and
the corner distance is larger than the center distance and smaller than the inward distance.

21. The cutting insert according to claim 19, wherein:
the secondary chip former merges with the rake surface at a base merging line;
as seen in a top view of the cutting insert, a forward direction line that: (a) passes through the inward end of the secondary chip former, (b) is perpendicular to a second reference line that passes through the outward and inward ends of the secondary chip former and, (c) extends from the inward end of the secondary chip former to the adjacent cutting edge, defines a forward direction towards the adjacent cutting edge;
the base merging line has an outward portion adjacent the outward end of the secondary chip former and an inward portion adjacent the inward end of the secondary chip former;
the outward portion of the base merging line is rearwardly located with respect to the second reference line; and
the inward portion of the base merging line is forwardly located with respect to the second reference line.

22. The cutting insert according to claim 21, wherein:
a rearward extremity of the base merging line is located closer to the cutting edge than a forward extremity of the base merging line.

23. The cutting insert according to claim 15 wherein the cutting insert is provided with a through bore extending between the upper surface and the lower surface.

24. The cutting insert according to claim 15, wherein:
each portion of the upper surface beyond the upper end of the main chip former and away from the cutting edge slopes at a different inclination angle with respect to the lower plane.

25. The cutting insert according to claim 24, wherein:
the inclination angle varies from a positive value to a negative value along the length of the upper end of the main chip former.

26. The cutting insert according to claim 15, wherein:
each of the first side surfaces has a first relief surface that extends downwardly from the cutting edge towards the lower surface;
the first relief surface is slanted at a first relief angle with respect to a first reference line perpendicular to the lower plane;
a second relief surface extends downwardly from the first relief surface to the lower surface; and
the second relief surface is slanted at a second relief angle with respect to the first reference line.

27. The cutting insert according to claim 26, wherein the first relief angle is smaller than the second relief angle.

28. The cutting insert according to claim 15, wherein:
the cutting insert has a generally square shape in a top view of the cutting insert, and
a center of a line connecting two diametrically opposed raised cutting corners defines a center of 180° rotational symmetry of the cutting insert, as seen in a top view of the cutting insert.

29. The cutting insert according to claim 15, wherein:
the cutting insert has a generally square shape in a top view of the cutting insert, and
a plane perpendicular to the lower plane and passing through two diametrically opposed raised cutting corners defines a symmetry plane of the cutting insert.

\* \* \* \* \*